(12) United States Patent
Kalyanpur et al.

(10) Patent No.: US 8,050,253 B2
(45) Date of Patent: Nov. 1, 2011

(54) METHODS, SYSTEMS, AND COMPUTER PROGRAM PRODUCTS FOR DECENTRALIZED PROCESSING OF SIGNALING MESSAGES IN A MULTI-APPLICATION PROCESSING ENVIRONMENT

(75) Inventors: Gaurang Kalyanpur, Allen, TX (US); Suchetha D. Raghavan, Plano, TX (US); Robby D. Benedyk, Angier, NC (US); Lane Liley, Cary, NC (US); Peter J. Marsico, Chapel Hill, NC (US); Apirux Bantukul, Cary, NC (US); Amrit P. S. Wadhwa, Cary, NC (US)

(73) Assignee: TEKELEC, Morrisville, NC (US)

( * ) Notice: Subject to any disclaimer, the term of this patent is extended or adjusted under 35 U.S.C. 154(b) by 1501 days.

(21) Appl. No.: 11/392,241

(22) Filed: Mar. 29, 2006

(65) Prior Publication Data

US 2007/0168421 A1 Jul. 19, 2007

Related U.S. Application Data

(60) Provisional application No. 60/757,297, filed on Jan. 9, 2006.

(51) Int. Cl.
*H04L 12/66* (2006.01)
(52) U.S. Cl. .................. 370/352; 370/384; 370/386
(58) Field of Classification Search ............ None
See application file for complete search history.

(56) References Cited

U.S. PATENT DOCUMENTS

| | | | |
|---|---|---|---|
| 4,191,860 A | 3/1980 | Weber | |
| 5,602,909 A | 2/1997 | Carkner et al. | |
| 5,650,998 A | 7/1997 | Angenot et al. | |
| 5,671,225 A | 9/1997 | Hooper et al. | |
| 5,838,683 A | 11/1998 | Corley et al. | |
| 5,852,660 A | 12/1998 | Lindquist et al. | |
| 6,002,693 A | 12/1999 | Hahn | |
| 6,134,618 A | 10/2000 | Hebert | |
| 6,145,120 A | 11/2000 | Highland | |
| 6,167,129 A | 12/2000 | Fikis et al. | |
| 6,182,086 B1 | 1/2001 | Lomet et al. | |
| 6,249,572 B1 | 6/2001 | Brockman et al. | |
| 6,311,323 B1 | 10/2001 | Shulman et al. | |

(Continued)

FOREIGN PATENT DOCUMENTS

EP 1 217 816 A1 6/2002

(Continued)

OTHER PUBLICATIONS

Office Action for U.S. Appl. No. 11/085,620 (Dec. 19, 2008).

(Continued)

*Primary Examiner* — Melanie Jagannathan
*Assistant Examiner* — Justin N Mullen
(74) *Attorney, Agent, or Firm* — Jenkins, Wilson, Taylor & Hunt, P.A.

(57) ABSTRACT

Disclosed are methods, systems, and computer program products for decentralized triggerless processing of signaling messages in a multi-application processing environment. According to one method, a signaling message is received at a screening module. At least one application to perform message processing on the signaling message is determined from a screening policy. The signaling message is modified to include application routing information to allow the at least one application to complete signaling message routing. The signaling message is forwarded to, and routed by, the at least one application using the application routing information.

27 Claims, 5 Drawing Sheets

U.S. PATENT DOCUMENTS

| | | | |
|---|---|---|---|
| 6,327,267 B1 | 12/2001 | Valentine et al. | |
| 6,396,840 B1 | 5/2002 | Rose et al. | |
| 6,434,155 B1 | 8/2002 | Jones et al. | |
| 6,578,187 B2 | 6/2003 | Yasuda | |
| 6,611,584 B1 | 8/2003 | Khello et al. | |
| 6,625,273 B1 | 9/2003 | Ashdown et al. | |
| 6,731,741 B1 | 5/2004 | Fourcand et al. | |
| 6,748,585 B2 | 6/2004 | Proebsting et al. | |
| 6,779,030 B1 | 8/2004 | Dugan et al. | |
| 6,785,374 B2 | 8/2004 | Wang et al. | |
| 6,795,546 B2 | 9/2004 | Delaney et al. | |
| 6,944,666 B2 | 9/2005 | Belkin | |
| 6,959,076 B2* | 10/2005 | Chang et al. | 379/207.02 |
| 7,286,545 B1 | 10/2007 | Tester et al. | |
| 7,554,974 B2 | 6/2009 | Palmer et al. | |
| 2001/0046285 A1 | 11/2001 | Park | |
| 2001/0053218 A1 | 12/2001 | Leung et al. | |
| 2002/0048360 A1 | 4/2002 | Zambre et al. | |
| 2002/0054674 A1 | 5/2002 | Chang et al. | |
| 2002/0059411 A1 | 5/2002 | Barnhouse et al. | |
| 2002/0163922 A1* | 11/2002 | Dooley et al. | 370/412 |
| 2002/0178262 A1* | 11/2002 | Bonnell et al. | 709/225 |
| 2002/0191768 A1 | 12/2002 | Stoughton | |
| 2003/0037108 A1 | 2/2003 | Peiffer et al. | |
| 2003/0231652 A1 | 12/2003 | Sprague et al. | |
| 2003/0235285 A1 | 12/2003 | Marsico | |
| 2004/0024894 A1 | 2/2004 | Osman et al. | |
| 2004/0264671 A1 | 12/2004 | Lamberton et al. | |
| 2005/0094623 A1 | 5/2005 | D'Eletto | |
| 2005/0141528 A1 | 6/2005 | Matsuhashi et al. | |
| 2005/0203994 A1* | 9/2005 | Palmer et al. | 709/203 |
| 2006/0209791 A1 | 9/2006 | Khadri et al. | |
| 2007/0086582 A1 | 4/2007 | Tai et al. | |
| 2008/0181382 A1 | 7/2008 | Lean et al. | |
| 2008/0209564 A1 | 8/2008 | Gayde et al. | |
| 2008/0260119 A1 | 10/2008 | Marathe et al. | |
| 2008/0285438 A1 | 11/2008 | Marathe et al. | |
| 2010/0118866 A1 | 5/2010 | Cannon | |
| 2011/0040884 A1 | 2/2011 | Khadri et al. | |

FOREIGN PATENT DOCUMENTS

| | | |
|---|---|---|
| KR | 1020030025024 | 3/2003 |
| WO | WO 02/07456 A1 | 1/2002 |
| WO | WO 2008/130709 A2 | 10/2008 |

OTHER PUBLICATIONS

Notice of Panel Decision from Pre-Appeal Brief Review for U.S. Appl. No. 10/796,653 (Dec. 8, 2008).
Communication of European Publication Number and Information on the Application of Article 67(3) EPC for European Application No. 07 709 644.4 (Sep. 3, 2008).
Notification of Transmittal of the International Search Report and the Written Opinion of the International Searching Authority, or the Declaration for International Application No. PCT/US2008/005175 (Aug. 12, 2008).
Communication pursuant to Article 94(3) EPC for European Application No. 03 796 406.1 (Jun. 19, 2008).
Notification of Transmittal of the International Search Report and the Written Opinion of the International Searching Authority, or the Declaration for International Application No. PCT/US08/01285 (Jun. 2, 2008).
Office Action for U.S. Appl. No. 10/796,653 (Apr. 30, 2008).
Notification of European Publication Number and Information on the Application of Article 67(3) EPC for European Application No. 06 739 166.4 (Nov. 21, 2007).
Notification of Transmittal of the International Search Report and the Written Opinion of the International Searching Authority, or the Declaration for International Application No. PCT/US06/10263 (Sep. 25, 2007).
Office Action for U.S. Appl. No. 10/796,653 (Oct. 2, 2007).
Communication pursuant to Article 96(2) EPC for European Application No. 03 796 406.1 (Sep. 28, 2006).
Notification of Transmittal of the International Search Report and Written Opinion of the International Searching Authority, or the Declaration for International Application No. PCT/US05/07712 (Jul. 25, 2006).
Supplementary European Search Report for European Application No. 03 796 406.1 (May 10, 2006).
Notification of European Publication Number and Information on the Application of Article 67(3) EPC for European Application No. 03 796 406.1 (Jul. 20, 2005).
Notification of Transmittal of the International Search Report or the Declaration for International Application No. PCT/US03/36520 (Jul. 6, 2004).
Notice of Allowance and Fee(s) Due for U.S. Appl. No. 10/294,400 (Apr. 28, 2004).
Redmill, "An Introduction to SS7," Booktrout Technology, pp. 1-26 (Jul. 2001).
"Integrated Services Digital Network (ISDN); Signalling System No. 7 (SS7); ISDN User Part (ISUP) Version 4 for the International Interface; Part 1: Basic Services," European Telecommunications Standards Institute, ETSI EN 300 356-1, V4.2.1, pp. 1-44 (May 2001).
"Integrated Services Digital Network (ISDN); Signalling System No. 7; Signalling Connection Control Part (SCCP) (connectionless and connection-oriented) to Support International Interconnection; Part 1: Protocol Specification," European Telecommunications Standards Institute, ETSI EN 300 009-1, V1.4.2, pp. 1-18 (Nov. 1999).
Liao et al., "SS7-TCAP/IP Interworking," Internet Engineering Task Force, pp. 1-14 (Mar. 1999).
Notification of Transmittal of the International Search Report and the Written Opinion of the International Searching Authority, or the Declaration for International Application No. PCT/US07/00492 (Oct. 19, 2007).
Final Official Action for U.S. Appl. No. 11/085,620 (Jun. 19, 2009).
Interview Summary for U.S. Appl. No. 11/085,620 (Apr. 30, 2009).
Notice of Allowance and Fee(s) Due for U.S. Appl. No. 10/796,653 (Feb. 26, 2009).
Final Official Action for U.S. Appl. No. 12/106,869 (Oct. 27, 2010).
Notice of Allowance and Fee(s) Due for U.S. Appl. No. 11/085,620 (Sep. 17, 2010).
Non-Final Official Action for U.S. Appl. No. 12/106,807 (Aug. 5, 2010).
European Search Report for European Patent No. 1867115 (Sep. 3, 2010).
Non-Final Official Action for U.S. Appl. No. 12/023,601 (Jul. 7, 2010).
First Office Action for Chinese Patent Application No. 200780008487.6 (Mar. 12, 2010).
Gurbani et al., "Accessing IN services from SIP networks," Internet-Draft, pp. 1-20 (Feb. 2001).
Haerens, "Intelligent Network Application Part (INAP) Support of the SIP/SDP Architecture," SIP Working Group, Internet Draft, pp. 1-12 (Oct. 1999).
Restriction and/or Election Requirement for U.S. Appl. No. 12/106,807 (Apr. 28, 2010).
Non-Final Official Action for U.S. Appl. No. 12/106,869 (Apr. 15, 2010).
Non-Final Official Action for U.S. Appl. No. 11/085,620 (Apr. 15, 2010).
Communication pursuant to Article 94(3) EPC for European Application No. 05 725 074.8 (Mar. 26, 2010).
Official Action for Chinese Patent Application No. 200680017480.6 (Mar. 18, 2010).
Summons to Attend Oral Proceedings Pursuant to Rule 115(1) EPC for European Patent No. 1568203 (Mar. 11, 2010).
Communication of European Publication Number and Information on the Application of Article 67(3) EPC for European Patent No. 2143230 (Dec. 16, 2009).
Supplementary European Search Report for European Patent No. 1738269 (Dec. 11, 2009).
"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).
"INAP Feature Module," Cisco MGC Software Release 9.5(2), pp. 1-16 (Dec. 3, 2003).
"Tekelec Introduces TekWare™ IN and TekWare Mediation," Tekelec, p. 1 (May 28, 2003).

"Tekelec Announces Advanced Signaling Architecture—TekWare," Tekelec, pp. 1-3 (Jun. 4, 2002).

Marshall et al., "SIP Extensions for Supporting Distributed Call State," SIP Working Group, Internet Draft, pp. 1-12 (Aug. 2001).

Crowe, "Cellular Network Perspectives," Wireless Review, pp. 1-4 (Mar. 2001).

"Interface Recommendation for Intelligent Network Capability Set 3: SCF-SSF Interface," ITU-T, Q.1238.2, pp. 7-9, 73-76, and 85-10 (Jun. 2000).

"Signalling System No. 7—ISDN User Part Functional Description," ITU-T, Q.762 (Dec. 1999).

"Signalling System No. 7—ISDN User Part Functional Description," ITU-T, Q.761 (Dec. 1999).

Handley et al., "SIP: Session Initiation Protocol," Network Working Group, RFC 2543 (Mar. 1999).

"Eagle STP Platform," Tekelec, Publication 908-0126-01, Rev. A, pp. 1-4 (Copyright 1997).

Notice of Abandonment for U.S. Appl. No. 12/106,869 (May 10, 2011).

Final Official Action for U.S. Appl. No. 12/023,601 (Feb. 16, 2011).

Non-Final Official Action for U.S. Appl. No. 12/106,807, (Feb. 15, 2011).

Communication under Rule 71(3) EPC for European Application No. 03 796 406.1 (Dec. 27, 2010).

* cited by examiner

METHODS, SYSTEMS, AND COMPUTER PROGRAM PRODUCTS FOR DECENTRALIZED PROCESSING OF SIGNALING MESSAGES IN A MULTI-APPLICATION PROCESSING ENVIRONMENT

RELATED APPLICATIONS

This application claims the benefit of U.S. Provisional Patent Application Ser. No. 60/757,297, filed Jan. 9, 2006; the disclosure of which is incorporated herein by reference in its entirety.

TECHNICAL FIELD

The subject matter described herein relates to processing signaling messages. More particularly, the subject matter described herein relates to methods, systems, and computer program products for decentralized processing of signaling message in a multi-application processing environment.

BACKGROUND

Signaling messages are used within communications networks to communicate information related to call setup, call tear down, call timing, billing, messaging and many related functions. Signaling messages are processed by various applications to achieve the desired functions. Examples of signaling message processing include triggerless processing of ISDN user part (ISUP), telephone user part (TUP), transaction capabilities application part (TCAP), mobile application part (MAP) and session initiation protocol (SIP) signaling messages in a multi-application environment. Some of the message types, such as ISUP and SIP messages relating to call setup, may be subjected to triggerless processing by a signaling message routing node. "Triggerless processing," as used herein, refers to the processing of a received signaling message without requiring an end office trigger to initiate the processing. For example, a signal transfer point (STP) may perform triggerless processing of received ISUP IAM messages requiring local number portability (LNP) lookups by performing LNP database lookups for the IAM messages without requiring end office trigger to initiate the lookups. Another example of triggerless processing that may be performed for received signaling messages includes screening. For example, received ISUP messages may be screened based on one or more parameters in each message and either routed to their respective destinations, or blocked, depending on the results of the screening.

Signaling messages are routed in communications networks through network elements for processing. Some examples of these network elements include an STP, a signaling system number 7 (SS7) Internet protocol (IP) signaling gateway (SG) (collectively SS7-IP SG), an SS7 gateway, a SIP server, a short message gateway (SMG), a softswitch (SS), and a media gateway controller (MGC).

When a signaling message is routed, the signaling message may be routed through and by any of these network elements. Some network elements may include screening functions or modules (hereinafter referred to as screening functions). Screening functions have traditionally been adapted to apply a screening policy to a received signaling message and to route the signaling message after the screening policy has been applied.

Screening policies may include a variety of processing tasks for any given signaling message. These processing tasks may include processing by one or more message processing applications. Example message processing applications include triggerless pre-paid service applications, number portability service applications, location portability service applications, usage measurements service applications, billing service applications, advanced/intelligent routing service applications (e.g., time of day routing, etc.), messaging service applications (e.g., short message service, multimedia message service, instant message service, etc.), presence service, ENUM service, and other signaling message-based network service applications.

Traditionally, screening policies have been implemented by screening functions that manage all aspects of the processing. These screening functions have acted as a cog in a wheel by placing themselves logically in the middle of several processing applications and sequentially sending signaling messages to applications one at a time for processing (as if sending them along the spokes of the wheel to each application). When signaling message processing is completed by any given application, the message is then sent by the application back to the screening function. The screening function then determines, based upon the screening policy, which application should process the message next and sends the message to that application. This repeats until all message processing is completed and the message is received back at the screening function. With the screening policy complete, the screening function may then route the signaling message to the next node in the network.

By handling all processing and routing decisions for every message, screening functions have traditionally managed all aspects of signaling message processing and routing. The traditional approach burdens the screening function with repeated message processing and routing tasks. This repeated processing burden consumes valuable signaling link bandwidth and requires a substantial amount of time.

For example, the SS7 signaling protocol includes various call setup timers that effectively limit the delays that can be incurred between network elements during call setup operations. Each time a signaling message is routed to the screening function and the screening function has to receive and process the message, an element of time delay is introduced. This repeated processing by a screening function may cause the maximum latency permitted by the SS7 ISUP call setup timers to be exceeded.

Bandwidth is also consumed on the order of 2N (where N is the number of applications). To clarify, for each application required to implement a given screening policy, two transmissions of the message occur: one from the screening function to the application; and another from the application back to Accordingly, in light of these difficulties associated with conventional message screening, there exists a need for improved methods, systems, and computer program products for screening policy implementation.

SUMMARY

According to one aspect, the subject matter described herein comprises methods, systems, and computer program products for decentralized processing of signaling messages in a multi-application processing environment. One method includes receiving a signaling message at a screening module, determining, from a screening policy, at least one application to perform triggerless message processing on the signaling message, modifying the signaling message to include application routing information to allow the at least one application to complete signaling message routing, forwarding the signaling message to the at least one application, and, at the at least one application, routing the signaling message using the application routing information.

By "complete signaling message routing," it is meant that the screening function inserts sufficient routing information in the message for the applications to forward the signaling message between applications designated to process the message without requiring the message to go back to the screening function, and, if the message passes all of the application processing, for forwarding the message to a destination without going back to the screening function.

The subject matter described herein providing decentralized processing of signaling messages in a multi-application processing environment may be implemented using a a non-transitory computer readable medium having stored thereon computer executable instructions that when executed by the processor of a computer perform steps of the aforementioned method. Exemplary computer readable media suitable for implementing the subject matter described herein include disk memory devices, chip memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

As the available number of subscriber services increase over time, the number of message screening and service tracking activities will increase as well. As a result, the delays and bandwidth consumption associated with message screening are also likely to increase. With each new consumer service and associated tracking correlating, potentially, to one or more new signaling message processing applications, a new approach to signaling message screening has become desirable to reduce message routing and processing latency.

In view of the burdens described above with respect to centralized message screening routing at a message screening function, the subject matter described herein distributes the responsibility of message routing to the applications that actually perform the screening. Where previously, a screening function was responsible for all routing activity (a cog in a wheel), the present subject matter includes methods, systems, and computer program products for decentralized processing of signaling message in a multi-application processing environment. By adapting the screening function and screening applications to process routing information differently, bandwidth and temporal savings may be achieved.

Figure 1:
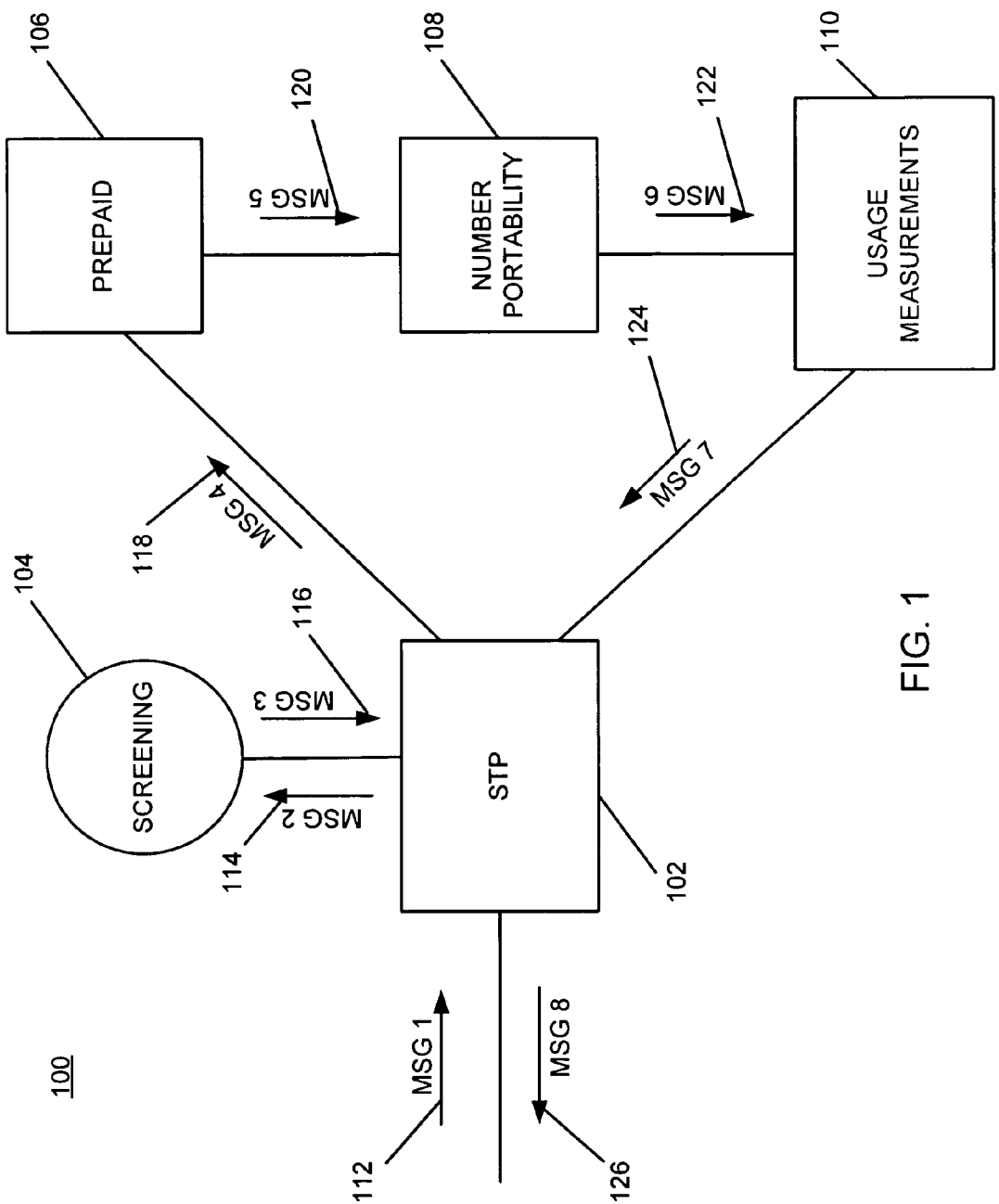
FIG. 1 is block diagram of an exemplary system for decentralized processing of signaling messages in a multi-application processing environment according to an embodiment of the subject matter described herein.

FIG. 1 illustrates an exemplary decentralized processing system 100 for decentralized triggerless processing of signaling messages in a multi-application processing environment. For this exemplary embodiment, an SS7 network environment will be discussed. Many other network environments are capable of implementing a screening function, such as, for example, an Internet protocol (IP) based network. Accordingly, all other such networks are considered within the scope of the present subject matter. As discussed above, exemplary network elements within an SS7 network include, for example, a signal transfer point (STP), an SS7-IP signaling gateway (SG), a short message gateway (SMG), a softswitch (SS) or media gateway controller (MGC). Exemplary network elements within an IP network include, for example, a SIP proxy server, an IP multimedia subsystem (IMS) call state control function (CSCF) element, and a SIP messaging server.

In the illustrated example, decentralized processing system 100 includes an STP 102, a signaling message screening function 104, a prepaid application 106, a number portability application 108 and a usage measurements application 110. In this embodiment, an SS7 ISUP call setup message 112 may be received at STP 102 and directed to signaling message screening function 104 as ISUP message 114. Call setup message 114 may include signaling message parameters derived from call setup message 112, as will be described below.

Screening function 104 may be internal to, co-located with, or external to STP 102. Screening function 104 may have access to any appropriate storage device capable of storing databases, tables, or other data structures used by screening function 104.

In operation, screening function 104 may receive ISUP message 114 and apply a screening policy or screening rule to the message. As described above, signaling message parameters may be included within ISUP message 114 and may be used to identify, evaluate and determine the screening policy or rules to be applied, including the sequence of application processing. For example, signaling message parameters used by screening function 104 may include an origination point code (OPC), a destination point code (DPC), a circuit identification code (CIC), a signaling indicator (SI), a message type, a called party number (CdPN), a calling party number (CgPN), and a carrier ID.

In one example, screening function 104 or a gateway screening function within STP 102 may make an initial determination as to whether a message is eligible for processing by one or more applications, such as applications 106, 108, and 110. In order to determine eligibility for application processing, screening function 104 or a gateway screening function within STP 102 may analyze one or more parameters in a message. For example, if the message is an ISUP message, screening function 104 or a gateway screening function within STP 102 may analyze the redirection number in the ISUP message to determine whether a call associated with the message is being directed to voicemail. If the redirection number indicates a voicemail number, it may not be necessary to perform any application processing of the message. Accordingly, the message may be routed to its destination rather than being screened. In another example, it may be desirable to analyze other ISUP parameters, such as OPC/DPC/CIC, and redirect a message to a specific service, such as prepaid service, in a manner that bypasses further screening or multi-application routing.

Screening policies of screening function 104 may be used to implement, for example, intelligent network (IN) and advance IN (AIN) features on behalf of an end office in the form of a proxy service. Screening rules implemented by screening function 104 may dictate that ISUP messages satisfying certain screening criteria should be processed by one or more message processing applications. Further, screening rules implemented by screening function 104 may specify a desired sequence of processing for the message processing applications.

For example, a screening rule implemented by screening function 104 may require that an ISUP IAM message associated with a call to (212) 450-1023 should be first processed by a pre-paid calling service application, then processed by a number portability application, and then processed by a usage measurements application. An exemplary screening rule, as described, is shown in Table 1 where the asterisk indicates that the rule depicted may apply to any called party within area code "212" and exchange "450."

TABLE 1

Exemplary Screening Rule

| CdPN | Application 1 | Application 2 | Application 3 |
|---|---|---|---|
| 212450* | Prepaid | Number Portability | Usage Measurements |

Screening function 104 may also include a data structure which maps application identifiers to SS7 point code addresses associated with screening applications. An exemplary data structure is shown in Table 2.

TABLE 2

Exemplary Application Point Code Data Structure

| Application ID | Application Point Code |
|---|---|
| Loopback | 1-1-1 |
| Prepaid | 2-2-2 |
| Number Portability | 3-3-3 |
| Usage Measurements | 4-4-4 |

Continuing with the discussion of FIG. 1, when ISUP message 114 is received at screening function 104, screening function 104 may identify the appropriate screening rule for the call. The exemplary screening rule of Table 1 will be used as the desired screening rule for the processing of ISUP message 114.

Based upon the screening rule depicted in Table 1, screening function 104 may generate or instantiate data structures to assist with processing of ISUP message 114. The first may be a temporary call detail record (CDR) or a stateful CDR-like data structure that may include information extracted from ISUP message 114. This temporary CDR may be used to identify the call or call state, respectively. For example, a temporary CDR may include OPC, DPC and CIC information, which identifies the call associated with ISUP call setup message 112 and ISUP message 114, as illustrated in Table 3.

TABLE 3

Exemplary CDR Data Structure

| OPC | DPC | CIC | Timestamp | APP1 | APP2 | APP3 |
|---|---|---|---|---|---|---|
| 5-5-5 | 10-10-10 | 255 | 07:04:10.12 | Prepaid | Number Portability | Usage Measure |

The temporary CDR may be used by screening function 104 to identify and correlate subsequent ISUP messages (e.g., subsequent address message, address complete, answer, release complete, etc.) that are associated with the same call. The temporary CDR may also include information which identifies applications to which previous messages related to the same call were sent for processing.

With the screening rule identified and the CDR instantiated, screening function 104 may then create ISUP message 116 by modifying ISUP message 114 to include application routing information. This application routing information may identify both the applications that are to process the message and the desired sequence of processing.

One approach to including routing information within ISUP message 116 may be to create a routing data structure, described herein as a List Of Pointcodes (LOP). Once created, this LOP may be included within ISUP message 116 as a routing parameter. There are many other possible ways to include routing information within ISUP message 116 and all are considered within the scope of this subject matter described herein. For simplicity, only the LOP will be discussed in detail.

An LOP structure may include any of the following fields: an Application Point Code field, an Application ID field, a Last Application field, and a Dirty Bit field. An exemplary LOP for use with ISUP message 116 is shown in Table 4.

TABLE 4

Exemplary LOP

| App. PC | App. ID | Last App. | Dirty Bit |
|---|---|---|---|
| 2-2-2 | Prepaid | 0 | 0 |
| 3-3-3 | Number Portability | 0 | 0 |
| 4-4-4 | Usage Measurements | 1 | 0 |
| 10-10-10 | Original DPC | 0 | 0 |

In Table 4, the Application Point Code field may include point codes for applications that are to process ISUP message 116. The Application ID field may include a character string or numeric representation of an application identifier. The Last Application field may include a binary indicator that may be set for the application that is to process ISUP message 116 last. The Dirty Bit field may include a binary indicator that may be set by each application sequentially as each processes ISUP message 116.

It should be noted that the original DPC of ISUP call setup message 112 has been included in this exemplary LOP as the last application ID. Placement of the original DPC as the last application ID allows preservation of the original DPC within the ISUP message and facilitates routing by the last application to the final destination. This process will be discussed in more detail below.

The routing and, consequently, the application processing of ISUP message 116 may follow the order in which applications are identified within the LOP. As discussed above, this routing sequence specified within the exemplary LOP should result in routing first to prepaid application 106, then to number portability application 108, and finally to usage measurements application 110.

It should be noted that applications may be identified within the LOP with both a point code and an application ID. Situations may arise wherein multiple applications may reside at the same point code. In situations such as these, the Application ID may be used by the network element to identify the intended applications at that point code address, and the order within the LOP may still be used to indicate the processing sequence for those applications at the same point code address.

Further, in reference to a data structure that may be used to implement the exemplary LOP of Table 4, the application ID may be a binary value, a hexadecimal value, a character string, or any other encoding format. The SS7 point code addresses may be a 24-bit American National Standards Institute (ANSI) format, a 14-bit International Telecommunication Union (ITU) format, or any other appropriate format for point code addresses.

The last application identified to process the ISUP message, which in the present embodiment is usage measurements application 110, has its LastApp bit set to a value of 1. As discussed above, the original DPC parameter value contained in ISUP message 116 may be included as the last entry in the LOP. Details of the use of these fields for processing the ISUP message will be discussed in more detail below.

Returning again to FIG. 1, screening function 104 may create ISUP message 116 by inserting the LOP parameter in ISUP message 114. The LOP may be placed in any location that is appropriate for a given protocol. Screening function 104 may then set the DPC field of the message transfer part (MTP) routing label of ISUP message 116 to the DPC of prepaid application 106, which in this example is the first application identified to process ISUP message 116. Screening function 104 may then forward ISUP message 116 to prepaid application 106 by way of STP 102. STP 102 may forward ISUP message 116 to prepaid application 106 as ISUP message 118.

ISUP message 118 may be received by prepaid application 106 and processing of the prepaid application task may begin. As part of the processing, prepaid application 106 may perform several operations. It may change the dirty bit to "1," thereby representing to subsequent applications that prepaid application 106 has processed the ISUP message.

If the application is stateful, so that it may process a message more than once, for example, initially and then again after forwarding the message to another application or applications for other processing, it may keep a copy of the list of point codes to allow it to further operate on the message at a future time. Discussion of this stateful operation will be limited herein for purposes of simplicity. It should be sufficient to note that stateful processing of messages may be achieved by maintenance of processing sequences within an application so that subsequent operations may be performed by an application after processing is completed by another application or applications.

Likewise, as described above for the case of multiple applications at the same point code, an application may analyze all point code entries in the LOP of a received message to determine whether the next application resides at the same point code. If the next application is present at the same point code, the application ID field may be used to indicate the order of processing. Again, for simplicity, the present embodiment will be described with only one application at each point code.

With the order of local application processing determined, prepaid application 106 may complete its operations on ISUP message 118. It may then analyze the LOP to determine whether it is the last application to process the ISUP message by inspecting the last application bit. Determining that it is not the last application, prepaid application 106 may then look up the first point code in the LOP parameter whose dirty bit is set to a "0." Prepaid application 106 may then insert that point code as the DPC of the MTP routing label and may forward ISUP message 120 to the next application, which, in this exemplary embodiment, is number portability application 108.

When ISUP message 120 is received by number portability application 108, number portability processing may be performed, the dirty bit may be set, the LOP parameter may be analyzed to locate the next point code, and the next point code may be inserted in the DPC of the MTP routing label. Number portability application 108 may then forward ISUP message 122 to usage measurements application 110 with the DPC of usage measurements application 110 as the DPC of the MTP routing label.

Usage measurements application 110 may collect one or more measurements for ISUP message 122 and examine the LOP parameter to locate the next application. In this example, usage measurements application 110 may recognize that it is the last application by inspection of the last application field in the LOP. It may also recognize that all other application dirty bits are set. Usage measurements application 110 may then replace the DPC of the MTP routing label with the original DPC included as the last entry of the LOP. Usage measurements application 110 may then forward ISUP message 124 to STP 102 with all application processing completed.

Upon receipt of ISUP message 124 at STP 102, normal processing may continue and STP 102 may forward ISUP message 126 to the final destination indicated by the original DPC.

As described above, screening function 104 is only required to process the original message one time. The 2N routing bandwidth requirements for traditional message screening architectures may be reduced to as little as 1N, again where N is the number of applications to process a given message. Latency may also be reduced as a function of at least two variables: processing time and transmission time. The reduction in processing time represents a savings over the processing time previously associated with traditional message screening where the screening function processed each message after every application processing event. The reduction in transmission time represents a savings over the transmission time previously associated with the multiple message returns to the screening function.

These improvements over traditional message screening architectures also may provide performance enhancement by reducing state machine complexity within a screening function. System maintenance and upgrade may also be enhanced by allowing applications to be added with minimal updates to the screening function. Static tables of available applications and feature processing sequences could be downloaded to the screening function without extensive provisioning or recompilation. Other aspects and performance enhancements are possible. Accordingly, all such enhancements are considered within scope of the present subject matter.

The example described above relates to an SS7 ISUP message. Alternatively, for example, a transaction capabilities application part (TCAP) message may be processed as a query in response to an end office trigger. As well, a telephone user part (TUP) message may be processed. Many other types of messages may be processed using the description herein and all such processing is considered within the scope of the subject matter described herein.

In an alternate example, the present subject matter may include processing IP telephony signaling messages, such as SIP signaling messages. In one processing example, a SIP INVITE message may be intercepted at a network routing node, such as a SIP—SS7 Gateway or a SIP server, and directed to a screening function, in a manner similar to that described above with respect to an SS7 ISUP implementation. The screening function may include screening policies or screening rules associated with SIP signaling and SIP users. An exemplary SIP screening rule is illustrated in Table 5.

TABLE 5

Exemplary SIP Screening Rules

| From | App 1 | App 2 | App 3 |
|---|---|---|---|
| *@tekelec.com | Prepaid | Usage Measurements | |

Screening rules may indicate that SIP messages satisfying certain screening criteria should be processed by one or more message processing applications. The screening function may also include a data structure, which maps application identifiers to SIP or IP addresses associated with the applications, such as those illustrated in Table 6.

TABLE 6

Exemplary Application ID/Address Information

| Application ID | Application Address |
|---|---|
| Prepaid | sip:ppd3.site3.atlanta.com |
| Usage Measurements | sip:uam2.site1.atlanta.com |

A SIP screening function may be adapted, for example, to create a temporary CDR or a stateful CDR-like data structure, similar to that discussed above, that includes information extracted from the SIP INVITE message, and which may identify the call or call state for the message, respectively. For example, a temporary CDR may include Call-ID information which may identify a call, as illustrated in Table 7. This temporary CDR may be used by the screening function to identify and correlate subsequent SIP messages that are associated with the same call. The temporary CDR may also contain information which identifies to which applications previous messages related to the same call were sent for processing.

TABLE 7

Exemplary CDR and Call State Information

| Call-ID | Timestamp | App 1 | App 2 |
|---|---|---|---|
| f81d4fae-9dec-11d0-a765-00a0c91e6bf6@tekelec.com | 07:04:10.12 | Prepaid | |

Having determined which applications are designated within the screening rules to process the SIP INVITE message, the screening function may modify the SIP INVITE message to include information that identifies both the message processing applications to process the message and the sequence in which these applications should route the message. This may, for example, be accomplished using SIP ROUTE and VIA parameters in the header of the SIP INVITE message.

A SIP ROUTE header parameter may be used to identify the address of a first message processing application to which the message should be routed. Multiple ROUTE header parameters may be used with each identifying the address of a message processing application to sequentially process the message. The ROUTE parameter(s) may be included in the INVITE message, and the INVITE message may then be routed from the screening function to the first message processing application. Message processing may occur at the first application, as discussed above, and the INVITE message may then be routed by each application to the next for subsequent processing until all applications represented in the sequence of ROUTE parameters have processed the message.

If a message processing application needs to receive or "touch" a subsequent response message associated with the INVITE message, the message processing application may insert it's address in a VIA parameter of the INVITE message before routing it on to the next application. In this manner, the message processing application may receive all subsequent response messages associated with the INVITE. This may be accomplished based upon the SIP principle that response message return through addresses specified in the VIA parameter(s) of the INVITE message. Multiple VIA parameters may be included in the SIP INVITE header to allow multiple applications to receive response messages.

Accordingly, SIP systems may use decentralized triggerless message processing as discussed herein to obtain temporal and bandwidth savings as discussed above. Many other signaling systems exist and all are considered within the scope of the subject matter described herein.

Figure 2:
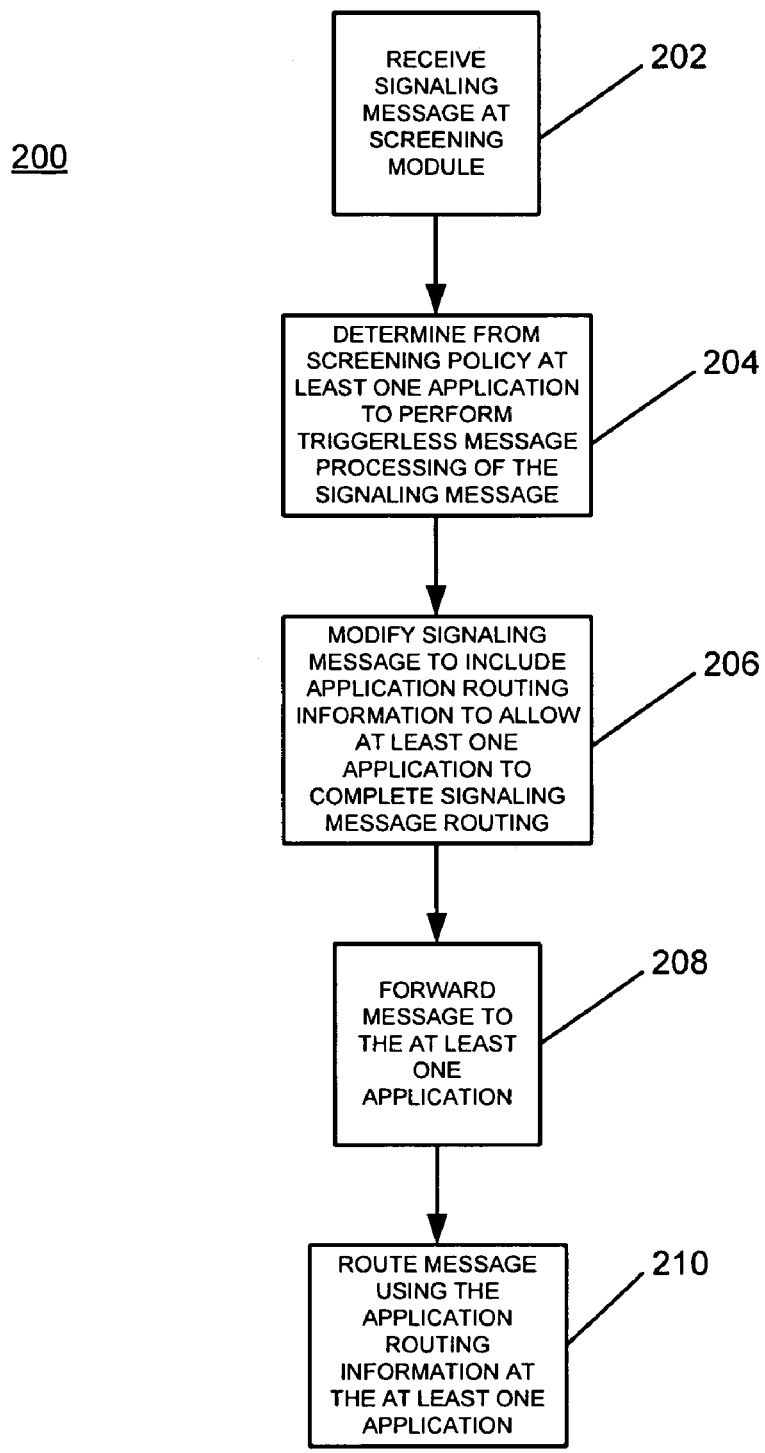
FIG. 2 is a flow chart illustrating exemplary steps by which decentralized processing of signaling messages in a multi-application processing environment may be performed according to an embodiment of the subject matter described herein.

FIG. 2 illustrates an exemplary decentralized process 200 for processing signaling messages in a multi-application processing environment. A block 202, decentralized process 200 may receive a signaling message at a screening module. Decentralized process 200 may determine, from a screening policy, at least one application to perform message processing on the signaling message at block 204. Alternatively, as described above, decentralized process 200 may determine that message processing is not required for the signaling message and may route the message to its destination without performing any further message processing. At block 206, decentralized process 200 may modify the signaling message signaling message to include application routing information to allow the at least one application to complete signaling message routing. At block 208, the signaling message may be forwarded to the at least one application, and at block 210, the at least one application may route the signaling message using the application routing information. In this way, applications may, by use of decentralized process 200, complete signaling message routing without returning the signaling message to a screening module/function.

Figure 3:
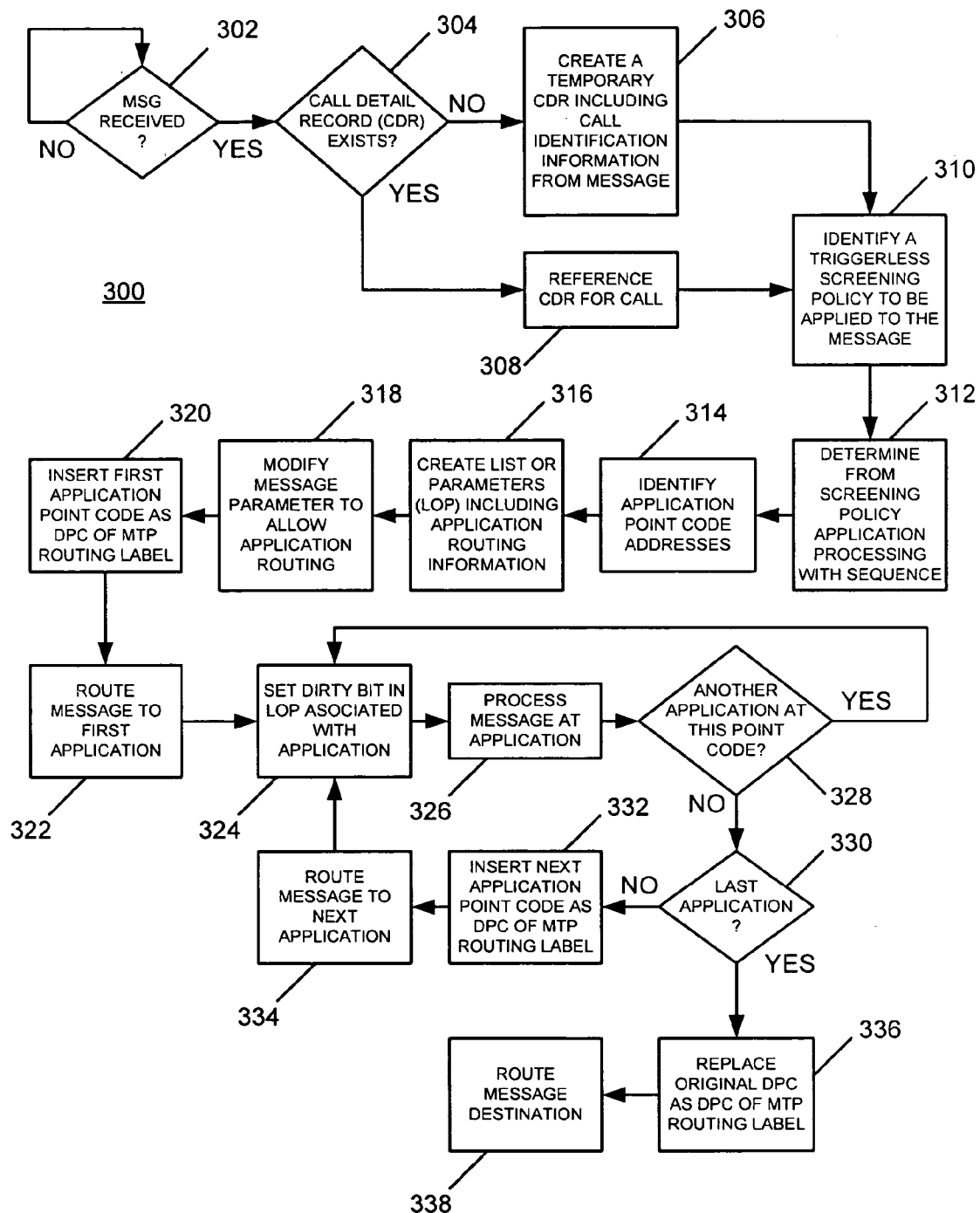
FIG. 3 is a flow chart illustrating exemplary steps by which decentralized processing of signaling messages in a multi-application processing environment may be performed using a call detail record (CDR) and a list of parameters (LOP) according to an embodiment of the subject matter described herein.

FIG. 3 illustrates an exemplary decentralized process 300 for processing signaling messages in a multi-application processing environment using a CDR and a LOP. At decision point 302, decentralized process 300 may wait for a signaling message to be received. When a message is received, decentralized process 300 may determine whether the message is associated with an existing call by determining whether a CDR already exists for the call at decision point 304. If there is no existing CDR associated with the signaling message at decision point 304, a temporary CDR may be created at block 306 including call identification information from the message, and if a CDR does exist it may be referenced for the call associated with the message at block 308. In either case, decentralized process 300 may identify a screening policy to be applied to the message at block 310.

A screening policy may be stored in any storage medium suitable for access by a process such as decentralized process 300. As discussed above, these screening policies may include application processing and an order of application processing to be performed on the signaling message.

A block 312, decentralized process 300 may determine from the screening policy a set of applications to process the signaling message and an associated sequence of processing. Application point code (PC) addresses for the applications associated with this screening policy may be identified at block 314.

At block 316, an LOP including application routing information may be created. A message parameter may be modified at block 318 to allow application routing. For example, the LOP may be placed within a message field, such as a header field, to allow the LOP to be passed with the message. At block 320, the application point code of the first application to process the message may be inserted as the destination point code (DPC) of the message transfer part (MTP) routing label.

The message may be routed to the first application at block 322. At block 324, application processing may begin by setting a dirty bit in the LOP associated with this application. The message may be processed by the application at block 326. Message processing may include any message processing discussed above, such as prepaid, number portability, and usage measurements. Many other message processing procedures exist and all are considered within the scope of his subject matter described herein.

At decision point 328, the application may determine whether there is another application at the current PC address to process the message. The application may do so by inspecting the LOP region associated with the next application. If there is another application at this point code to process the message, decentralized process 300 may return to block 324 for the second application processing at this point code and the process may repeat until all applications at the present point code have finished processing the signaling message.

When all applications at the present point code have completed processing the signaling message at decision point 328, the application may inspect the last application field in the LOP to determine if it is the last application to process the signaling message at decision point 330. If the current application is not the last application, the application may insert the PC address of the next application as the DPC of the MTP routing label for the signaling message at block 332.

As described above, this point code may be part of the LOP fields associated with the next application. At block 334, the application may route the signaling message to the next application and decentralized triggerless process 300 may transition to block 324 to repeat processing of the signaling message at the next application residing, this time, at a different PC address.

Decentralized process 300 will repeat the processing as described above for all applications at all point codes, as determined from the screening policy as described above and encoded in the LOP, until the last application is reached at decision point 330. When the last application has finished its processing, it may replace the original DPC stored in the LOP as the DPC of the MTP routing label of the signaling message at block 336. At block 338, the application may route the signaling message to the destination.

As described above in relation to decentralized process 300, the signaling message was processed only once by a screening function rather than repeatedly after every application. The signaling message was routed to the first application, which processed the message and routed the message within the network. All routing after the initial screening function routing to the first application was performed by the applications themselves. Applications may, by use of decentralized process 300, complete signaling message routing without returning the signaling message to a screening function. As well, as described above, both temporal and bandwidth savings may be realized. Signaling message routing has been distributed to the signaling message processing applications rather than being centralized at a screening function.

Figure 4:
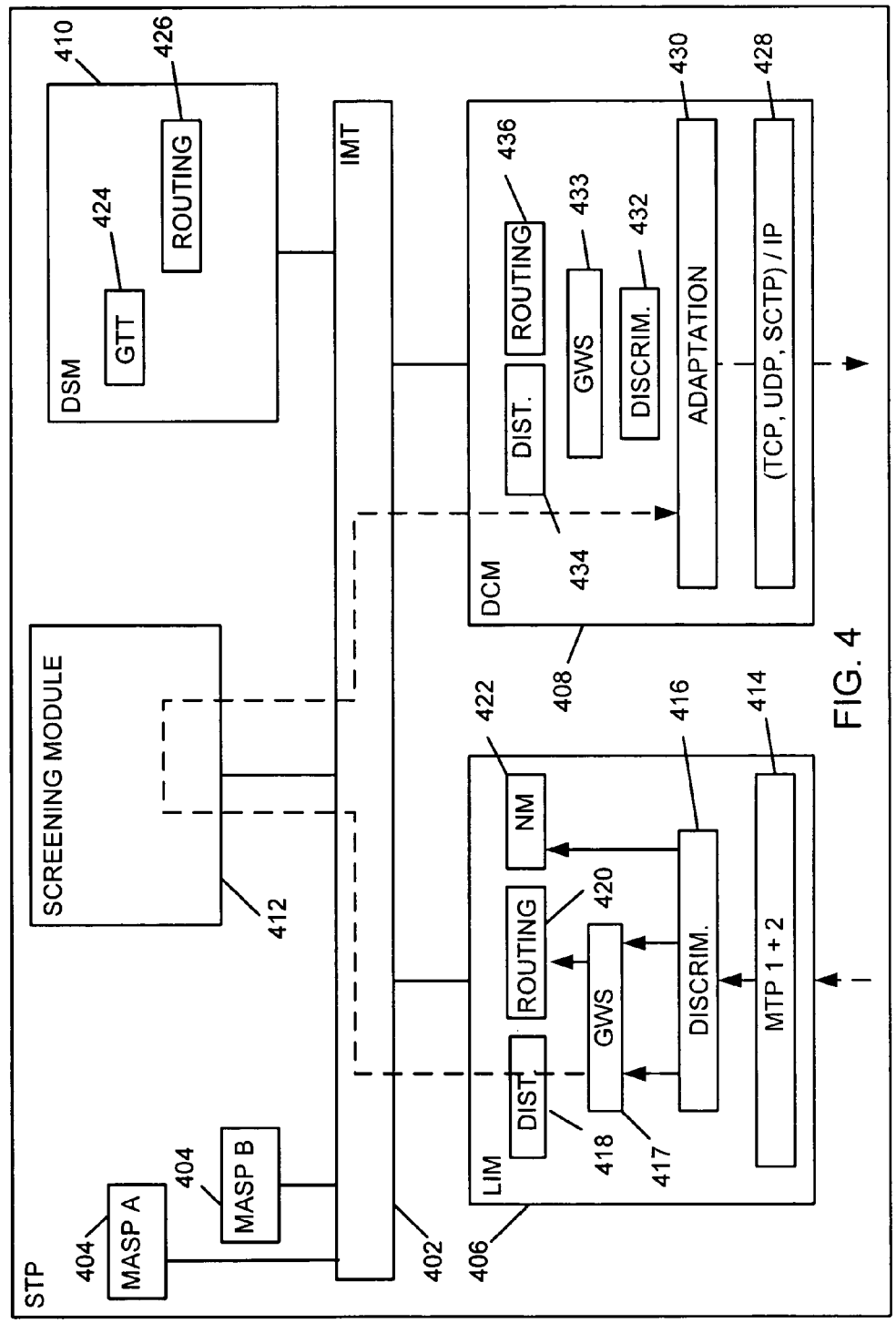
FIG. 4 is block diagram of an exemplary signaling transfer point (STP) including a screening module to identify application processing sequences for screening of signaling messages at applications according to an embodiment of the subject matter described herein.

FIG. 4 illustrates an STP routing node, such as STP 102 including a screening system to identify application processing sequences for triggerless screening of signaling messages at applications. In FIG. 4, STP 102 includes a high speed inter-processor message transport (IMT) communications bus 402. A number of distributed processing modules or cards may be coupled to IMT bus 402. In FIG. 4, these processing modules or cards include a pair of maintenance and administration subsystem processors (MASP) 404, an SS7 link interface module (LIM) 406, an IP-capable data communication module (DCM) 408, a database services module (DSM) 410, and a screening module 412. These modules may be physically connected to the IMT bus 402 such that signaling and other types of messages may be routed internally between active cards or modules. The distributed, multi-processor architecture of STP 102 facilitates the deployment of multiple LIM, DCM, DSM and other cards, all of which may be simultaneously connected to and communicating via IMT bus 402.

MASP pair 404 implement the maintenance and administration subsystem functions described above. As MASP pair 404 are not particularly relevant to a discussion of the flexible routing attributes of the present invention, a detailed discussion of their function is not provided herein.

LIM 406 interfaces with one or more external signaling links. LIM 406 may have a number of sub-components. In FIG. 4, these sub-components include an SS7 MTP level 1 & 2 function 414, an SS7 MTP level 3 layer message discrimination function 416, a gateway screening (GWS) function 417, message distribution function 418, a routing function 420, and a signaling network management (NM) function 422.

MTP level 1 and 2 function 414 provides the facilities necessary to send and receive digital data over a particular physical medium, as well as to provide error detection, error correction and sequenced delivery of SS7 messages. Message discrimination function 416 receives signaling messages from the lower processing layers and performs a discrimination function that effectively determines whether an incoming SS7 message requires internal processing or is simply to be through switched. Examples of received SS7 messages that require internal processing include signaling connection control part messages in need of global title translation and signaling network management messages.

For SCCP messages that require GTT processing by database services module 410, message distribution function 418 may receive such messages from discrimination function 416 and direct the messages to database services module 410 via IMT bus 402. This type of internal distribution of messages within the STP node should not be confused with message routing, which refers to selecting an external signaling link over which a received message should be forwarded.

Gateway screening function 417 may examine one or more parameters and signaling message and determine whether to allow the signaling message to pass into a network. Conventional parameters examined by a gateway screening function include the destination point code of a received signaling message. According to one implementation of the subject matter described herein, gateway screening function 417 may examine one or parameters of received ISUP messages to determine eligibility for processing by screening module 412 and by the associated applications. For example, as described above, if a redirection parameter and a received ISUP message corresponds to voicemail, gateway screening function 417 may forward the message to routing function 420 for routing, rather than to screening module 412 for further processing.

In order to identify messages as candidates for screening by screening module 412, discrimination function 416 and/or gateway screening function 417 may first determine whether the messages are the type that require such screening. For example, discrimination function 416 or gateway screening function 417 may identify ISUP, SIP, TCAP, or other message types as candidates for screen by screening module 412. Discrimination function 416 or gateway screening function 417 may forward such messages to distribution module 418. Distribution module 418 may forward the messages to screening module 412 for further screening.

Routing function 420 is responsible for examining an incoming message and determining on which outbound linkset and link the message is to be transmitted. For example, routing function 420 may examine a destination point code in a received message, and perform a lookup in an MTP level 3 route table to select a route to the destination point code. Once route selection is made, routing function 420 ensures that the message is directed internally to the appropriate communication module (e.g., SS7 LIM, IP DCM, ATM high speed link (HSL), etc.) for outbound transmission.

MTP level 3 signaling network management function 422 may receive, process, and generate messages associated with the management and administration of an SS7 signaling network. NM function 422 may selectively communicate network management information to adjacent signaling points, so as to prevent the unwarranted sending of network management messages to nodes that are not affected by network failures.

As illustrated in FIG. 4, database services module 410 includes a global title translation (GTT) function 424 and a routing function 426. If GTT processing is needed, GTT function 424 may be used to translate digits present in a signaling message (e.g., an 800 number) to destination point codes (DPCs) and subsystem numbers (SSNs) to allow routing of these messages to the final destination. Routing function 426 performs the same routing functions as those described above with respect to routing function 420. Once this determination is made, routing function 426 ensures that the message is directed internally to the appropriate communication module (e.g., SS7 LIM, IP DCM, ATM HSL, etc.) for outbound transmission.

Screening module 412 may implement triggerless signaling message screening, as discussed above. By analyzing a signaling message, creating CDR and LOP structures, placing the LOP within the signaling message, and forwarding the signaling message to an application for processing and further routing at the application.

DCM 408 includes an IP transport function 428, a signaling protocol adaptation function 430, a discrimination function 432, a gateway screening function 433, a distribution function 434, and a routing function 436. IP transport function 428 includes hardware and software for implementing OSI layers 1-3. For example, IP transport function may implement a physical layer protocol, such as Ethernet, a network layer protocol, such as IP, and a transport layer protocol, such as transmission control protocol (TCP), user datagram protocol (UDP), and/or stream control transmission protocol (SCTP). Adaptation function 430 may receive a signaling message from an IP network that is formatted according to a first signaling protocol (e.g., M3UA, SUA, M2PA, TALI or other IP adaptation layer protocol), and adapt or reformat the message into a second signaling protocol (e.g., MTP). Adaptation function 430 may also receive a signaling message, such as a SIP message, and translate the SIP message into an equivalent SS7 or SS7-adaptation protocol message, and vice-versa. These adaptation and translation processing operations may be performed on in-bound and out-bound signaling messages. Adaptation function 430 may also receive outbound SS7 messages from other modules in STP 102 and modify the messages for transport over the IP network according to the appropriate signaling transport or other IP adaptation layer protocol.

Discrimination function 432 performs discrimination operations similar to those described above with respect to discrimination function 416. In addition to the SS7 and SS7-adaptation protocol discrimination parameters described above, discrimination function 432 may also examine received SIP message parameters including a To parameter, a From parameter, a Via parameter, a source IP address parameter, a destination IP address parameter, and others. Discrimination based on these parameters enables function 432 to determine whether screening or internal processing is required. According to one embodiment, discrimination function 432 may copy a received signaling message, such that the original message may be routed to the target destination and the message copy may be processed by one or more processing subsystems associated with STP 102.

Gateway screening function 433 may perform operations similar to gateway screening function 417 to determine eligibility for screening of received messages by screening module 412. For example, gateway screening function 433 may analyze one or more parameters and receive ISUP messages to determine whether the ISUP messages are eligible for screening. If messages are eligible for screening, gateway screening function 433 and/or discrimination function 432 may forward such messages to distribution function 434. Distribution function 434 may forward such messages to screening module 412 for screening.

Distribution function 434 handles the internal routing of message packets that require additional processing prior to final routing. Such messages may include signaling messages associated with message service messages such as SMS, MMS, and IM services (e.g., SIP INFO message, SIP MESSAGE message, SIP INVITE message, etc.), as well as mobility management messages. Routing function 436 is adapted to access network routing rule information, which may include SS7 and IP network routing rules, and apply these routing rules to messages that require routing.

Figure 5:
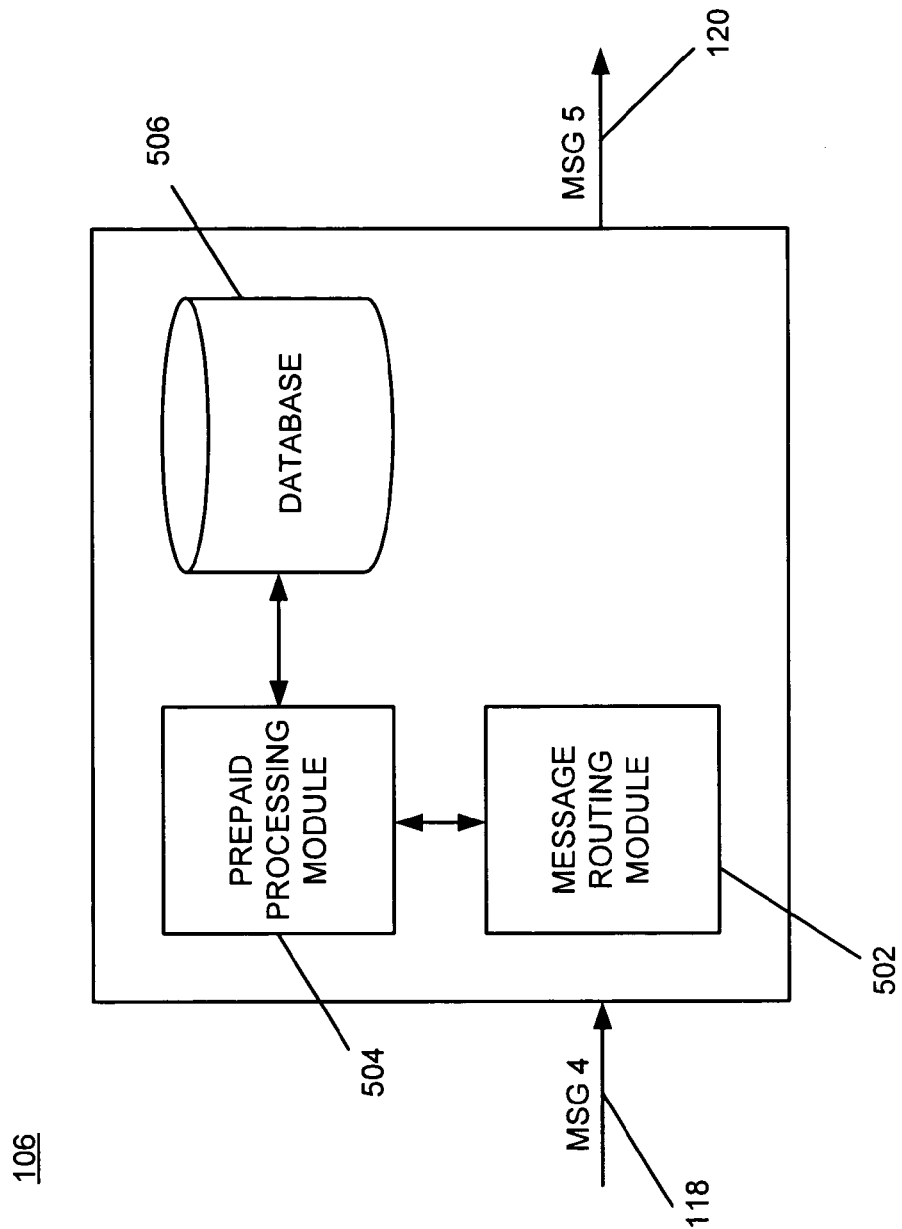
FIG. 5 is block diagram of an exemplary application for decentralized triggerless routing of a signaling message according to an embodiment of the subject matter described herein.

FIG. 5 illustrates an exemplary application, such as prepaid application 106 for decentralized routing of a signaling message. When signaling message 118 arrives at prepaid application 106, it may first be processed by message routing module 502. Message routing module 502 may inspect the LOP within the message and set the dirty bit within the LOP for the prepaid application at this point code. As discussed above, there may be more than one application at a given point code. For this exemplary embodiment, only one application resides at this point code.

Message routing module 502 may then forward the message to prepaid processing module 504 for message processing. Message processing may include modifications to the message itself or service tracking, such as billing and other activities, as discussed above. To aid prepaid processing module 504 in message processing and service tracking, database 506 may be used to store application processing routines and data, and tracking data structures. Prepaid processing module 504 may retrieve processing routines and data from database 506 and may store any tracking details that are associated with this message to database 506.

When message processing is complete, prepaid processing module 504 may return the message to message routing module 502, which may determine whether there is another application at this point code, which as discussed above, will yield a negative result in this embodiment. Message routing module 502 may inspect the LOP to determine whether it is the last application to process the signaling message. In this exemplary embodiment, there are other applications that need to process the signaling message. Accordingly, message routing module 502 may insert the point code of the next application as the MTP routing label for the message and route the message as signaling message 120 to the next application.

Thus, as described above, rather than requiring that a message be forwarded back and forth multiple times between processing applications and a screening function, the subject matter described herein allows a message to be screened once, processed by one or more applications, routed among the applications using application routing information inserted by the screening function, and then routed to a destination. The processing performed by the screening function and the applications may be triggerless processing in the case of ISUP messages sent between end offices. In addition, the processing may be triggered processing in the case of processing TCAP messages sent by an end office to a signaling message routing node for processing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for decentralized processing of signaling messages in a multi-application processing environment, the method comprising:
(a) receiving a signaling message at a signaling message routing node;
(b) determining, based on a parameter in the signaling message, eligibility for screening by a screening module;
(c) in response to determining that the message is eligible for screening by the screening module, forwarding the signaling message to the screening module;
(d) at the screening module, determining from a screening policy, a first application of a plurality of applications to perform message processing on the signaling message;
(e) modifying the signaling message to include application routing information to allow each of the applications to complete signaling message routing, wherein completing signaling message routing includes inserting sufficient routing information in the signaling message for each of the applications determined to perform message processing on the signaling message to forward the signaling message without requiring the signaling message to return to the screening module;
(f) forwarding the signaling message to the first application; and (g) at the first application, routing the message to a second application of the applications using the application routing information inserted in the signaling message without requiring that the signaling message be returned to the screening module.

2. A system for decentralized processing of signaling messages in a multi-application processing environment, the system comprising:
(a) a communication module including a card for receiving a signaling message; and
(b) a screening module embodied in a non-transitory computer readable medium and associated with the communication module for:
(i) determining, from a screening policy, a first application of a plurality of applications to perform message processing on the signaling message;
(ii) modifying the signaling message to include application routing information to allow each of the plurality of applications to complete signaling message routing, wherein completing signaling message routing includes inserting sufficient routing information in the signaling message for each of the applications determined to perform message processing on the signaling message to forward the signaling message without requiring the signaling message to return to the screening module; and
(iii) forwarding the signaling message the first application.

3. The system of claim 2 wherein the communication module is adapted to receive a signaling message selected from a group consisting of a triggerless signaling message, an ISDN user part (ISUP) message, a telephone user part (TUP) message, a transaction capabilities application part (TCAP) message, and a session initiation protocol (SIP) message.

4. The system of claim 3 wherein the signaling message comprises a SIP INVITE message and wherein the screening module is adapted to modify at least one of a SIP VIA parameter and a SIP ROUTE parameter, associated with each of the plurality of applications, in a header of the SIP INVITE message.

5. The system of claim 2 wherein the screening module and the communication module are co-located with a network element.

6. The system of claim 5 wherein the network element includes a network element selected from a group consisting of a signal transfer point (STP), a signaling system number 7 (SS7) Internet protocol (IP) signaling gateway (SG) (collectively SS7-IP SG), an SS7 gateway, a SIP server, an IP multimedia subsystem (IMS) call state control function (CSCF) element, a short message gateway (SMG), a softswitch (SS), and a media gateway controller (MGC).

7. The system of claim 2 wherein the screening module is adapted to, based upon the screening policy, identify a sequence in which at least one of the plurality of applications should process the signaling message.

8. The system of claim 2 wherein the screening module is adapted to implement, as part of the screening policy, on behalf of an end office in the form of a proxy service, a network feature selected from a group consisting of intelligent network (IN) and advanced IN (AIN) features.

9. The system of claim 2 wherein the screening module is adapted to modify at least one parameter in the signaling message selected from a group consisting of a destination point code (DPC) field of the message transfer part (MTP) routing label, an origination point code (OPC), a circuit identification code (CIC), a signaling indicator (SI), a message type, a called party number (CdPN), a calling party number (CgPN), a carrier ID, and a SIP VIA parameter.

10. The system of claim 2 wherein, in modifying the signaling message, the screening module is adapted to create at least one temporary data structure that includes information which maps at least one application identifier for at least one of the plurality of applications to an address selected from a group consisting of a session initiation protocol (SIP) address, an internet protocol (IP) address, and an SS7 point code (PC) address associated with the at least one of the plurality of applications.

11. The system of claim 2 wherein, in determining from a screening policy a plurality of applications to perform message processing on the signaling message, the screening module is adapted to create at least one temporary call detail record (CDR) data structure that includes information extracted from the signaling message uniquely identifying the call.

12. The system of claim 11 wherein the temporary CDR includes at least one of origination point code (OPC) information, destination point code (DPC) information, circuit identification code (CIC) information, and call-ID information, at least one of which correlates with at least one of a subsequent address message, an address complete message, an answer message, and a release complete message associated with the same call.

13. The system of claim 11 wherein the temporary CDR includes information identifying at least one application to which previous messages related to the same call were sent for processing.

14. The system of claim 2 wherein, in modifying the signaling message, the screening module is adapted to create at least one temporary stateful call detail record (CDR) data structure that includes information extracted from the signaling message identifying call state.

15. The system of claim 2 wherein the plurality of applications includes at least one of a pre-paid services application, a number portability service application, a location portability service application, a usage measurements services application, a billing application, and an advanced intelligent routing services application.

16. The system of claim 2 wherein, in modifying the signaling message, the screening module is adapted to place a list of pointcodes (LOP) parameter into the signaling message.

17. The system of claim 16 wherein the LOP parameter includes at least one of an application point code field, an application ID field, a last application field, and a dirty bit field.

18. The system of claim 17 wherein the application ID is formatted with a formatting selected from a group consisting of a binary format, a hexadecimal format, and a character string format.

19. The system of claim 17 wherein the application point code field is formatted with a formatting selected from a group consisting of 24-bit American National Standards Institute (ANSI) format and 14-bit International Telecommunication Union (ITU) format.

20. The system of claim 17 wherein the last application field associated with a last application includes an indication alerting the last application to remove the LOP parameter from the signaling message.

21. The system of claim 17 wherein the last application field associated with a last application includes an indication alerting the last application to replace the destination point code (DPC) field of a message transfer part (MTP) routing label within the signaling message with an original DPC parameter from the signaling message included as the last entry of the LOP parameter.

22. The system of claim 17 wherein each of the plurality of applications are adapted to modify the dirty bit field to indicate that processing by each of the plurality of applications is complete.

23. The system of claim 2 wherein the application routing information includes network addresses usable by the applications and wherein the applications are adapted to use the network addresses to route the signaling message between the applications and to a destination.

24. The system of claim 2 wherein, in determining from the screening policy at least one of a plurality of applications to perform message processing on the signaling message, the screening module is adapted to determine from the screening policy at least one of the plurality of applications to perform triggerless message processing on the signaling message.

25. The system of claim 2 wherein, in determining from the screening policy at least one of a plurality of applications to perform message processing on the signaling message, the screening module is adapted to determine from the screening policy at least one of the plurality of applications to perform triggered message processing on the signaling message.

26. A system for decentralized processing of signaling messages in a multi-application processing environment, the system comprising:
a signaling message routing node including:
(a) a communication module including a card for receiving a signaling message;
(b) a first screening module embodied in a non-transitory computer readable medium and for analyzing at least one parameter in the signaling message and determining eligibility for further screening of the signaling message; and
(c) a second screening module for:
(i) determining, from a screening policy, a first application of a plurality of applications to perform message processing on the signaling message;
(ii) modifying the signaling message to include application routing information to allow each of the plurality of applications to complete signaling message routing, wherein completing signaling message routing includes inserting sufficient routing information in the signaling message for each of the at least one applications determined to perform message processing on the signaling message to forward the signaling message without requiring the signaling message to return to the screening module; and
(iii) forwarding the signaling message the first application of the plurality of applications.

27. A non-transitory computer readable medium having stored thereon computer executable instructions that when executed by the processor of a computer control the computer to perform steps comprising:
(a) receiving a signaling message at a screening module;
(b) determining, from a screening policy, a first application of a plurality of applications to perform message processing on the signaling message;
(c) modifying the signaling message to include application routing information to allow each of the applications to complete signaling message routing, wherein completing signaling message routing includes inserting sufficient routing information in the signaling message for each of the applications determined to perform message processing on the signaling message to forward the signaling message without requiring the signaling message to return to the screening module;
(d) forwarding the signaling message to the first application; and
(e) at the least one application, routing the signaling message to a second application of the applications using the application routing information inserted in the signaling message without requiring that the signaling message be returned to the screening module.

* * * * *